(12) United States Patent
Kim

(10) Patent No.: US 12,267,026 B2
(45) Date of Patent: Apr. 1, 2025

(54) TEXTILE TRIBOELECTRIC NANOGENERATORS WITH DIVERSE 3D-SPACER FABRICS FOR IMPROVED OUTPUT VOLTAGE

(71) Applicant: University of Seoul Industry Cooperation Foundation, Seoul (KR)

(72) Inventor: Hyeok Kim, Seoul (KR)

(73) Assignee: University of Seoul Industry Cooperation Foundation, Seoul (KR)

( * ) Notice: Subject to any disclaimer, the term of this patent is extended or adjusted under 35 U.S.C. 154(b) by 13 days.

(21) Appl. No.: 18/090,028

(22) Filed: Dec. 28, 2022

(65) Prior Publication Data

US 2023/0208323 A1 Jun. 29, 2023

(30) Foreign Application Priority Data

Dec. 28, 2021 (KR) .......... 10-2021-0190432

(51) Int. Cl.
*H02N 1/04* (2006.01)
*H02N 2/18* (2006.01)

(52) U.S. Cl.
CPC .......... *H02N 1/04* (2013.01); *H02N 2/18* (2013.01)

(58) Field of Classification Search
CPC . H02N 1/04; H02N 2/18; B32B 3/263; B32B 27/12; C08L 63/04; D03D 25/005
(Continued)

(56) References Cited

U.S. PATENT DOCUMENTS 10,447,178 B1 * 10/2019 Hays .......... H02N 2/18
2014/0111063 A1 * 4/2014 Bae .......... H10N 30/30
977/948

(Continued)

FOREIGN PATENT DOCUMENTS

KR 20150027415 A 3/2015
KR 20160024643 A 3/2016
KR 20210036183 A 4/2021

OTHER PUBLICATIONS

R L Harne and K W Wang, A review of the recent research on vibration energy harvesting via bistable systems, Jan. 25, 2013, Smart Mater. Struct., 22 023001.
(Continued)

*Primary Examiner* — Ahmed Elnakib
(74) *Attorney, Agent, or Firm* — NKL Law; Jae Youn Kim

(57) ABSTRACT

A triboelectric nanogenerator (TENG) using a 3D-spacer fabric and polydimethylsiloxane (PDMS) shows great application potential for biokinetic energy harvesting and a multifunctional self-power device. In the present disclosure, a TENG with a fabric-PDMS-fabric structure is fabricated using diverse three-dimensional (3D) fabrics and PDMS. Peak-to-peak output voltages of the diverse 3D-spacer fabrics are compared. The output voltages are changed due to structures and vertical fibers. In addition, a coefficient of surface friction between PDMS and fabric improves the output voltage. TENGs using different 3D-spacer polymeric fabrics show different maximum peak-to-peak output voltage performances. This is due to the stiffness, lateral elasticity, and 3D morphology of the fabrics. It is considered that those factors including the stiffness, the lateral elasticity, and the 3D morphology influence the densities in vertical and lateral fiber-to-fiber interaction.

13 Claims, 4 Drawing Sheets

(58) Field of Classification Search
USPC .................................................. 310/309, 310
See application file for complete search history.

(56) References Cited

U.S. PATENT DOCUMENTS

| | | | | |
|---|---|---|---|---|
| 2015/0061460 | A1* | 3/2015 | Bae | H02N 1/04 977/948 |
| 2016/0156282 | A1* | 6/2016 | Kim | A61N 1/0484 607/61 |
| 2018/0006582 | A1* | 1/2018 | Kim | H02N 1/04 |
| 2019/0160279 | A1* | 5/2019 | Farah | D03D 1/0088 |
| 2019/0356243 | A1* | 11/2019 | Zhi | B32B 5/06 |
| 2019/0379300 | A1* | 12/2019 | Cao | H10N 30/073 |
| 2020/0123687 | A1* | 4/2020 | Gupta | D05B 87/04 |
| 2020/0237046 | A1* | 7/2020 | Wu | D02G 3/441 |
| 2022/0239236 | A1* | 7/2022 | Swisher | H05K 1/038 |
| 2023/0208323 | A1* | 6/2023 | Kim | H02N 2/18 310/310 |
| 2023/0216433 | A1* | 7/2023 | Kim | H02N 1/04 310/310 |

OTHER PUBLICATIONS

Minbaek Lee, et al., A Hybrid Piezoelectric Structure for Wearable Nanogenerators, Adv. Mater. 2012, 24, 1759-1764.

Bhubaneswari Parida, S. Iniyan, Ranko Goic, A review of solar photovoltaic technologies, Renewable and Sustainable Energy Reviews, vol. 15, Issue 3, 2011, pp. 1625-1636.

Premkumar Vincent, et al., Indoor-type photovoltaics with organic solar cells through optimal design, Dyes and Pigments, vol. 159, 2018, pp. 306-313.

Jung, S., Lee, J., Hyeon, T., Lee, M. and Kim, D.-H. (2014), Fabric-Based Integrated Energy Devices for Wearable Activity Monitors. Adv. Mater., 26: 6329-6334. https://doi.org/10.1002/adma.201402439.

Federico Lorussi, et al., Wearable, Redundant Fabric-Based Sensor Arrays for Reconstruction of Body Segment Posture, IEEE Sensors Journal, vol. 4, No. 6, Dec. 2004.

Min Zhang, et al., A hybrid fibers based wearable fabric piezoelectric nanogenerator for energy harvesting application, Nano Energy, vol. 13, 2015, pp. 298-305.

Sung Soo Kwak, et al., Fully Stretchable Textile Triboelectric Nanogenerator with Knitted Fabric Structures, ACS Nano 2017 11 (11), 10733-10741.

Chaoyu Chen, et al., 3D double-faced interlock fabric triboelectric nanogenerator for bio-motion energy harvesting and as self-powered stretching and 3D tactile sensors, Materials Today, vol. 32, 2020, pp. 84-93.

Zhong Lin Wang, Triboelectric Nanogenerators as New Energy Technology for Self-Powered Systems and as Active Mechanical and Chemical Sensors, American Chemical Society Nano, vol. 7, No. 11, 9533-9557, 2013.

Pu, X., Li, L., Liu, M., Jiang, C., Du, C., Zhao, Z., Hu, W. and Wang, Z.L. (2016), Wearable Self-Charging Power Textile Based on Flexible Yarn Supercapacitors and Fabric Nanogenerators. Adv. Mater., 28: 98-105.

Tao Zhou, et al., Woven Structured Triboelectric Nanogenerator for Wearable Devices, ACS Appl. Mater. Interfaces, 6, 16, 14695-14701, Jul. 27, 2014.

Chaoxing Wu, et al., Wearable Electricity Generators Fabricated Utilizing Transparent Electronic Textiles Based on Polyester/Ag Nanowires/Graphene Core-Shell Nanocomposites, ACS Nano 2016, 10, 7, 6449-6457, Jun. 10, 2016.

Navneet Soin, et al., Novel "3-D spacer" all fibre piezoelectric textiles for energy harvesting applications, Energy Environ. Sci., 2014, 7, 1670.

Seung-Bae Jeon, et al., Self-powered wearable keyboard with fabric based triboelectric nanogenerator, Nano Energy, vol. 53, 2018, pp. 596-603.

M El-Kashouti, et al. "Printing Technology on Textile Fibers: Review". Journal of Textiles, Coloration and Polymer Science, 16, 2, 2019, 129-138.

Kim, Do-Kyung, et al. Improved Output Voltage of a Nanogenerator with 3D Fabric, Journal of Nanoscience and Nanotechnology, vol. 20, No. 8, Aug. 2020, pp. 4666-4670(5).

A. Bayazit Marmarali. Dimensional and Physical Properties of Cotton/Spandex Single Jersey Fabrics. Department of Textile. Engineering, Ege University, Izmir, Turkey, Textile Res. J. 7733(1). 11-14. Jan. 2003.

H. Dabiryan, et al. Analysis of warp-knitted fabric structure. Part II: theoretical study on initial modulus of warp-knitted fabrics (tricot, locknit, and satin), The Journal of The Textile Institute, 103:9, 997-1011, Feb. 6, 2012.

Sohyun Park, et al. Analysis of the wetting state of super-repellent fabrics with liquids of varying surface tension. RSC Adv., 2016, 6, 45884.

Navneet Soin et al. "Novel "3-D spacer" all fibre piezoelectric textiles for energy harvesting applications†", Energy & Enviromental Science, vol. 7, No. 5, May 2014, pp. 1527-1794.

* cited by examiner

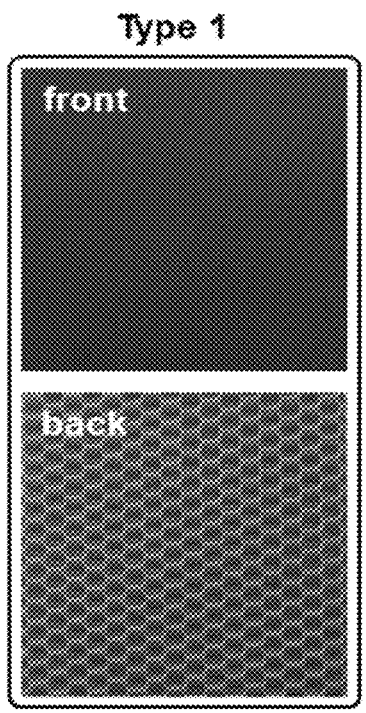 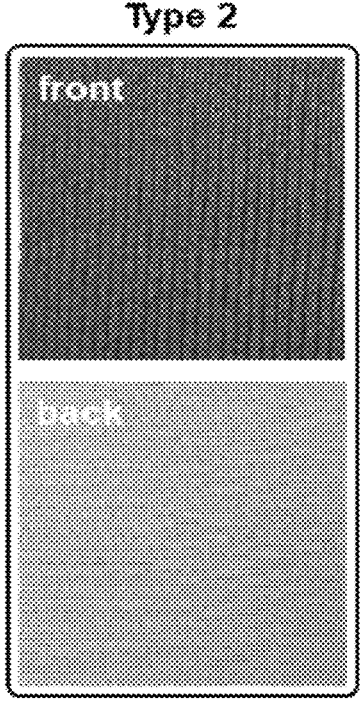 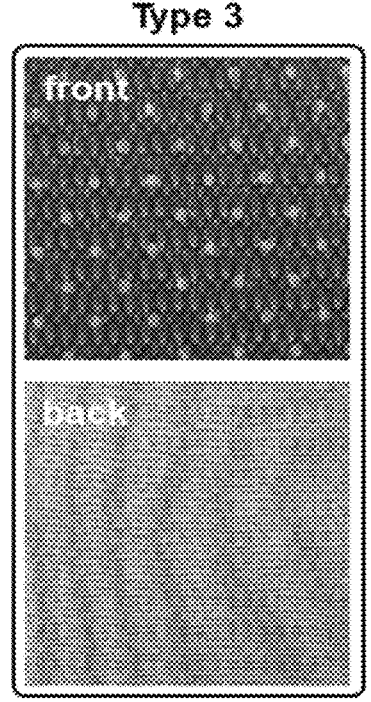
FIG. 2A     FIG. 2B     FIG. 2C
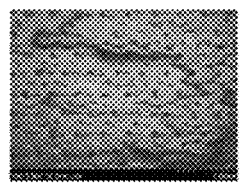 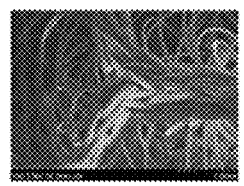 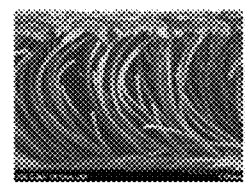 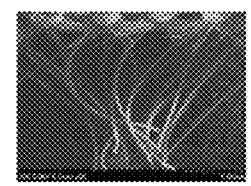
FIG. 3A     FIG. 3B     FIG. 3C     FIG. 3D Type 2
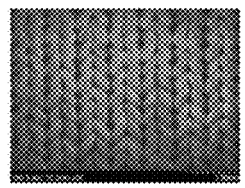 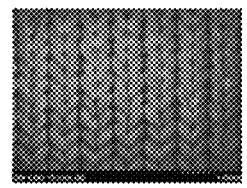 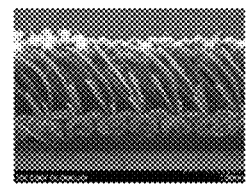 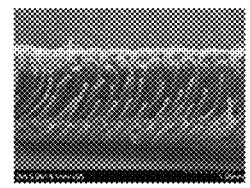
FIG. 3E    FIG. 3F    FIG. 3G    FIG. 3H
Type 3
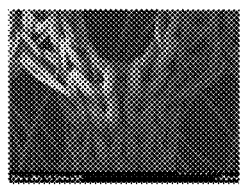 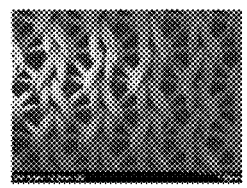 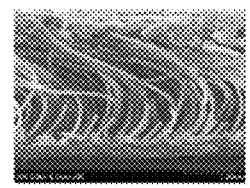 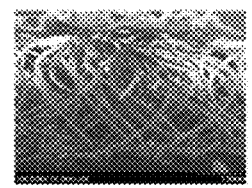
FIG. 3I    FIG. 3J    FIG. 3K    FIG. 3L
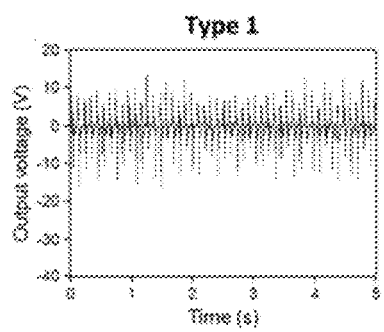 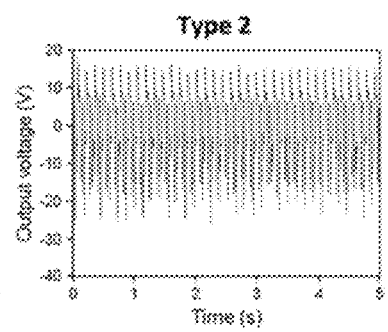 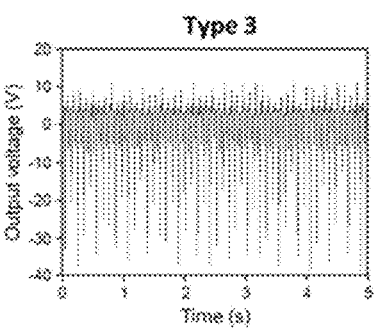
FIG. 4A    FIG. 4B    FIG. 4C

TEXTILE TRIBOELECTRIC NANOGENERATORS WITH DIVERSE 3D-SPACER FABRICS FOR IMPROVED OUTPUT VOLTAGE

BACKGROUND

1. Field of the Invention

The present disclosure relates to a textile triboelectric nanogenerator using fabrics. More particularly, the present disclosure relates to a triboelectric nanogenerator with an improved output voltage using three-dimensional (3D) spacer fabrics.

2. Discussion of Related Art

As securing sustainable and eco-friendly energy becomes an issue around the world, energy harvesting technology that harvests electric energy from energy sources that are wasted or consumed in everyday life such as light, heat, and vibration is in the spotlight. In addition, fibers have been used by mankind for a long time and are essential materials for daily life. The fiber is bendable, portable, and foldable and thus can be applied to everyday activities. Versatile, wearable, and portable electronics are evolving rapidly and may provide a great advantage for telecommunications, personal health care, and environmental monitoring.

Accordingly, among many energy harvesting devices, a flexible triboelectric nanogenerator (TENG) using fibers received great attention because the flexible TENG has a wearable energy harvesting function that acquires and stores energy generated from the interaction between the environment around the human body and human activities. The flexible TENG is an energy source that can be easily used in wearable electronic products and portable electronic products.

However, many studies require complex and expensive processes for the high-performance TENG using fibers. In addition, the TENG, which can be worn on the human body, must be comfortable and harmless to the wearer, and must conveniently harvest energy from body movements. In order to overcome such a problem, research on diverse fibers is also necessary, and TENG performance improvement and device structure studies using fibers are also essential. A TENG using a typical two-dimensional (2D) fabric structure has many problems. This is because the TENG's performance is lowered due to the limited contact area and surface triboelectricity.

RELATED ART DOCUMENTS

Non-Patent Documents

1. Harne, R. L.; Wang, K. W. A review of the recent research on vibration energy harvesting via bistable systems. Smart Mater. Struct. 2013, 22, 023001.
2. Lee, M.; Chen, C. Y.; Wang, S.; Cha, S. N.; Park, Y. J.; Kim, J. M.; Chou, L. J.; Wang, Z. L. A hybrid piezoelectric structure for wearable nanogenerators. Adv. Mater. 2012, 24, 1759-1764.
3. Parida, B.; Iniyan, S.; Goic, R. A review of solar photovoltaic technologies. Renew. Sustain. Energy Rev. 2011, 15, 1625-1636.
4. Vincent, P.; Shin, S. C.; Goo, J. S.; You, Y. J.; Cho, B.; Lee, S.; Lee, D. W.; Kwon, S. R.; Chung, K. B.; Lee, J. J. et al. Indoor-type photovoltaics with organic solar cells through optimal design. Dyes Pigment. 2018, 159, 306-313.
5. Jung, S.; Lee, J.; Hyeon, T.; Lee, M.; Kim, D. H. Fabric-based integrated energy devices for wearable activity monitors. Adv. Mater. 2014, 26, 6329-6334.
6. Lorussi, F.; Rocchia, W.; Scilingo, E. P.; Tognetti, A.; de Rossi, D. Wearable, redundant fabric-based sensor arrays for reconstruction of body segment posture. IEEE Sens. J. 2004, 4, 807-818.
7. Zhang, M.; Gao, T.; Wang, J.; Liao, J.; Qiu, Y.; Yang, Q.; Xue, H.; Shi, Z.; Zhao, Y.; Xiong, Z. et al. A hybrid fibers based wearable fabric piezoelectric nanogenerator for energy harvesting application. Nano Energy 2015, 13, 298-305.
8. Kwak, S. S.; Kim, H.; Seung, W.; Kim, J.; Hinchet, R.; Kim, S. W. Fully stretchable textile triboelectric nanogenerator with knitted fabric structures. ACS Nano 2017, 11, 10733-10741.
9. Chen, C.; Chen, L.; Wu, Z.; Guo, H.; Yu, W.; Du, Z.; Wang, Z. L. 3D double-faced interlock fabric triboelectric nanogenerator for bio-motion energy harvesting and as self-powered stretching and 3D tactile sensors. Mater. Today 2020, 32, 84-93.
10. Wang, Z. L. Triboelectric nanogenerators as new energy technology for self-powered systems and as active mechanical and chemical sensors. ACS Nano 2013, 7, 9533-9557.
11. Pu, X.; Li, L.; Liu, M.; Jiang, C.; Du, C.; Zhao, Z.; Hu, W.; Wang, Z. L. Wearable self-charging power textile based on flexible yarn supercapacitors and fabric nanogenerators. Adv. Mater. 2016, 28, 98-105.
12. Zhou, T.; Zhang, C.; Han, C. B.; Fan, F. R.; Tang, W.; Wang, Z. L. Woven structured triboelectric nanogenerator for wearble devices. ACS Appl. Mater. Interfaces 2014, 6, 14695-14701.
13. Wu, C.; Kim, T. W.; Li, F.; Guo, T. Wearable electricity generators fabricated utilizing transparent electronic textiles based on polyester/Ag nanowires/graphene core—Shell nanocomposites. ACS Nano 2016, 10, 6449-6457.
14. Soin, N.; Shah, T. H.; Anand, S. C.; Geng, J.; Pornwannachai, W.; Mandal, P.; Reid, D.; Sharma, S.; Hadimani, R. L.; Bayramol, D. V. et al. Novel "3-D spacer" all fibre piezoelectric textiles for energy harvesting applications. Energy Environ. Sci. 2014, 7, 1670-1679.
15. Jeon, S. B.; Park, S. J.; Kim, W. G.; Tcho, I. W.; Jin, I. K.; Han, J. K.; Kim, D.; Choi, Y. K. Self-powered wearable keyboard with fabric based triboelectric nanogenerator. Nano Energy 2018, 53, 596-603.
16. El-Kashouti, M.; Elhadad, S.; Abdel-Zaher, K. Printing technology on textile fibers. J. Text. Color. Polym. Sci. 2019, 16, 129-138.
17. Kim, D. K.; Jeong, J. B.; Lim, K.; Ko, J.; Lang, P.; Choi, M.; Lee, S.; Bae, J. H.; Kim, H. Improved output voltage of a nonagenerator with 3D fabric. J. Nanosci. Nanotechnol. 2020, 20, 4666-4670.
18. Marmarali, A. B. Dimensional and physical properties of cotton/spandex single jersey fabrics. Text. Res. J. 2003, 73, 11-14.
19. Dabiryan, H.; Jeddi, A. A.; Rastgoo, A. Analysis of warp-knitted fabric structure. Part II: Theoretical study on initial modulus of warp-knitted fabrics (tricot, locknit, and satin). J. Text. Inst. 2012, 103, 997-1011.
20. Park, S.; Kim, J.; Park, C. H. Analysis of the wetting state of super-repellent fabrics with liquids of varying surface tension. RSC Adv. 2016, 6, 45884.

SUMMARY OF THE INVENTION

The present disclosure is directed to providing a triboelectric nanogenerator with improved output voltage.

In order to achieve the above-described object, the present disclosure proposes three-dimensional (3D)-spacer fabrics that combine a single jersey structure, a honeycomb structure, and a tricot structure in order to introduce various fibers that provide comfortable elasticity to the human body and to improve an output voltage of a triboelectric nanogenerator (TENG) using fibers.

BRIEF DESCRIPTION OF THE DRAWINGS

The above and other objects, features, and advantages of the present disclosure will become more apparent to those of ordinary skill in the art by describing exemplary embodiments thereof in detail with reference to the accompanying drawings, in which:

FIGS. 2A-2C is a set of pictures of front surfaces and back surfaces of 3D-spacer fabrics used in each embodiment of the present disclosure;

FIGS. 3A-3L illustrates scanning electron microscope (SEM) images of each 3D-spacer fabric;

FIGS. 4A-4F are graphs illustrating output voltages and currents of three 3D-spacer fabric TENGs each using an FPF structure over time.

DETAILED DESCRIPTION OF EXEMPLARY EMBODIMENTS

Figure 1A:
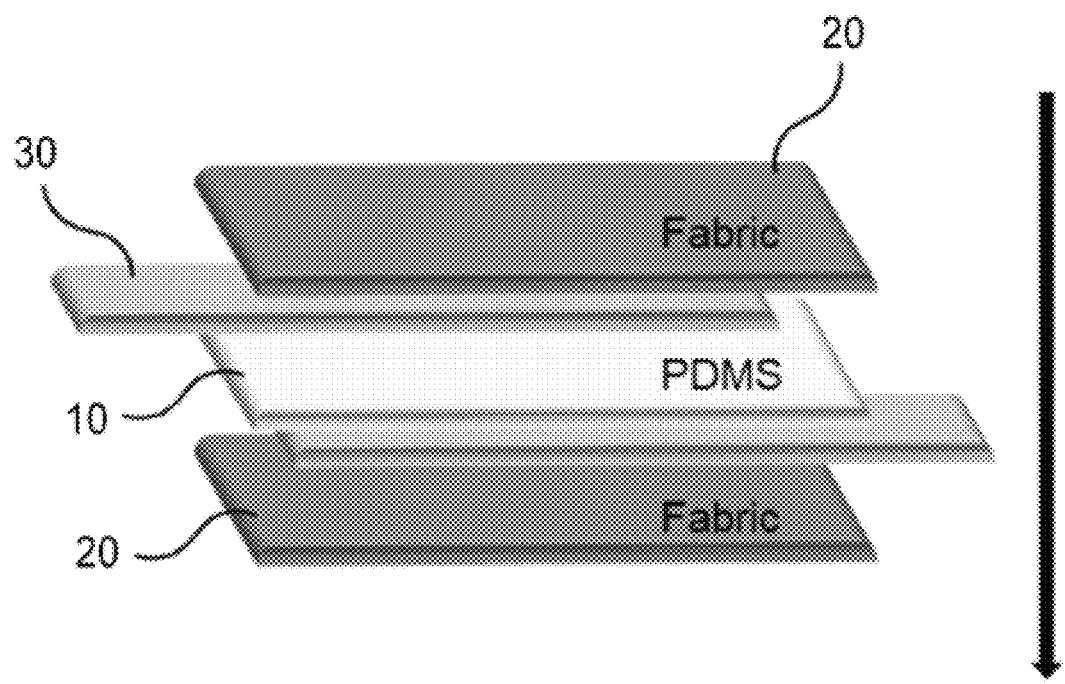
FIGS. 1A and 1B is a set of a schematic view and a cross-sectional view of a triboelectric nanogenerator (TENG) with a fabric-polydimethylsiloxane (PDMS)-fabric (FPF) structure according to the present disclosure.

Terms used in the present specification will be briefly described, and an embodiment of the present disclosure will be described in detail. In terms used in the present specification, general terms currently as widely used as possible while considering functions in the present disclosure are used. However, the terms may vary according to the intention or precedent of a technician working in the field, the emergence of new technologies, and the like. In addition, in certain cases, there are terms arbitrarily selected by the applicant, and in this case, the meaning of the terms will be described in detail in the description of the corresponding invention. Accordingly, the terms used in the present specification should be defined based on the meaning of the terms and the overall contents of the present disclosure, not just the name of the terms.

Hereinafter, embodiments of the present disclosure will be described in detail with reference to the accompanying drawings.

As securing sustainable and eco-friendly energy becomes an issue around the world, energy harvesting technology that harvests electric energy from energy sources that are wasted or consumed in everyday life such as light, heat, and vibration is in the spotlight. In addition, fibers have been used by mankind for a long time and are essential materials for daily life. A fiber material is bendable, portable, and foldable and thus can be applied to everyday activities. Versatile, wearable, and portable electronics are evolving rapidly and may provide a great advantage for telecommunications, personal health care, and environmental monitoring.

Accordingly, among many energy harvesting devices, a flexible triboelectric nanogenerator (TENG) using fibers received great attention because the flexible TENG has a wearable energy harvesting function that acquires and stores energy generated from the interaction between the environment around the human body and human activities. The flexible TENG is an energy source that can be easily used in wearable electronic products and portable electronic products.

However, a conventional high-performance TENG using fibers requires complex and expensive processes. In addition, the TENG, which can be worn on the human body, must be comfortable and harmless to the wearer, and must conveniently harvest energy from body movements. In order to overcome such a problem, research on various fibers is also necessary, and TENG performance improvement and device structure studies using fibers are also essential. A TENG using a typical two-dimensional (2D) fabric structure has many problems. This is because the TENG's performance is lowered due to the limited contact area and surface triboelectricity.

For this reason, in order to introduce various fibers that provide comfortable elasticity to the human body and to improve an output voltage of the TENG using fibers, the present disclosure proposes three-dimensional (3D)-spacer fabrics that combine a single jersey structure, a honeycomb structure, and a tricot structure.

A Type 1 fabric is made of 100% polyester (PE) and has a single jersey with foil finishing-honeycomb structure.

A Type 2 fabric is made of 92% PE and 8% spandex (SP) and has a single jersey-single jersey structure.

A Type 3 fabric is made of 100% PE and has a honeycomb-tricot structure.

In addition, an output voltage and current of each 3D-spacer fabric-TENG were compared. In addition, in the present disclosure, a fabric-polydimethylsiloxane (PDMS)-fabric (FPF) structure exhibiting an excellent output voltage due to a high coefficient of surface friction between PDMS and fabric was used. The present disclosure is expected to contribute to the commercialization of next-generation wearable electronic devices and sleep monitoring sensors.

Figure 1B:
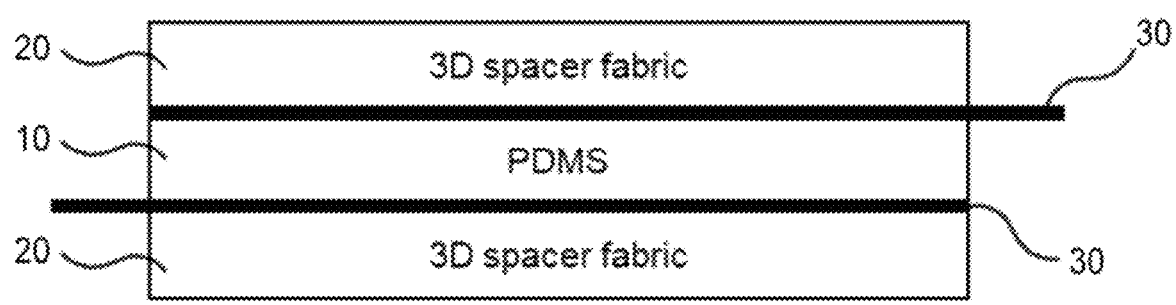

FIG. 1A is a schematic view of a TENG with a fabric-PDMS-fabric structure according to the present disclosure, and FIG. 1B illustrates a cross section of the TENG with a fabric-PDMS-fabric structure according to the present disclosure.

In the present disclosure, the TENG was fabricated with three 3D-spacer fabrics and PDMS.

Specifically, the TENG according to the present disclosure includes a PDMS layer 10, a 3D-spacer fabric 20 stacked on each of front and back surfaces of the PDMS layer 10, and an electrode 30 inserted between the PDMS layer 10 and each 3D-spacer fabric 20.

An arrow shown in FIG. 1A indicates a stacking order of the fabric-PDMS-fabric structure.

The PDMS material is used because the output voltage can be improved due to a high coefficient of surface friction between PDMS and fabric. Tribo-negative and tribo-positive surfaces maximize the improvement of the output voltage of the TENG due to a high potential of the TENG. Thus, the PDMS (tribo-negative) and the fabric (tribo-positive) were introduced.

FIGS. 2A-2C is a set of pictures of front surfaces and back surfaces of 3D-spacer fabrics used in each embodiment of the present disclosure.

FIG. 2A illustrates a Type 1 fabric made of 100% PE, and having a single jersey structure with a foil finish on a front surface and a honeycomb structure on a back surface.

FIG. 2B illustrates a Type 2 fabric made of 92% PE and 8% SP, and having a single jersey structure on both front and back surfaces.

FIG. 2C illustrates a Type 3 fabric made of 100% PE, and having a honeycomb structure on a front surface and a tricot structure on a back surface.

The PDMS was prepared using Sylgard-184 from an elastomeric PDMS kit by Dow-Corning. Specifically, a base/curing agent mixture in a 10:1 weight ratio was stirred for 10 minutes or more. After stirring, the mixture was placed in a vacuum desiccator to remove trapped air bubbles. The mixture was then poured onto a silicon wafer and cured at 100° C. for 1 hour. A copper tape electrode was inserted between the PDMS layer and the fabric. In the present embodiment, each TENG was manufactured to have a size of 8 cm×8 cm. The magnitude of force applied while testing the TENG was fixed to 10 N, and a measurement frequency was fixed at 8 Hz.

FIGS. 3A-3L illustrates scanning electron microscope (SEM) images of each 3D-spacer fabric.

FIGS. 3A to 3D illustrate the SEM images of the Type 1 fabric. FIG. 3A illustrates a front surface of the Type 1 fabric. FIG. 3A illustrates a single jersey structure with a foil finish. Foil finish processing makes the single jersey structure with the foil finish less stretchable as compared to a single jersey structure without a foil finish.

FIG. 3B illustrates a back surface of the Type 1 fabric. A surface of a hexagonal honeycomb structure can be seen through FIG. 3B. FIG. 3C illustrates a (100) cross section of the Type 1 fabric. FIG. 3D illustrates a (010) cross section of the Type 1 fabric. Fibers disposed vertically between a top and a bottom of the fabric may be seen through FIG. 3C. Fibers disposed vertically between a top and a bottom of the fabric may be seen through FIG. 3D. Unlike that in FIG. 3C, both sides of the fiber are twisted. The vertically disposed fibers maximize a triboelectric effect even with small deformation.

FIGS. 3E to 3H illustrate the SEM images of the Type 2 fabric. FIG. 3E illustrates a front surface of the Type 2 fabric. FIG. 3F illustrates a back surface of the Type 2 fabric. It can be seen that the front and back surfaces have the same single jersey structure through FIGS. 3E and 3F. Since the single jersey structure has low elasticity in a width direction, the elasticity in the width direction was supplemented by mixing spandex in the Type 2 fabric. FIG. 3G illustrates a (100) cross section of the Type 2 fabric. FIG. 3H illustrates a (010) cross section of the Type 2 fabric. Since the Type 2 fabric does not have a honeycomb structure, the number of vertical fibers is less than those of the Type 1 fabric and the Type 3 fabric. In addition, unlike the honeycomb structure, the vertical fibers are placed in only one direction when viewed from (100) and (010).

FIGS. 3I and 3L illustrate the SEM images of the Type 3 fabric.

FIG. 3I illustrates a front surface of the Type 3 fabric. FIG. 3G illustrates a surface of a hexagonal honeycomb structure, like FIG. 3B. FIG. 3J illustrates a back surface of the Type 3 fabric. FIG. 3J illustrates a tricot structure. The tricot structure has excellent elasticity. FIG. 3K illustrates a (100) cross section of the Type 3 fabric. FIG. 3L illustrates a (010) cross section of the Type 3 fabric. Like FIGS. 3C and 3D of the Type 1 fabric, FIGS. 3K and 3L illustrate vertically disposed fibers of the Type 3 fabric. Like Type 1, both sides of the fiber are twisted.

Figure 4D:
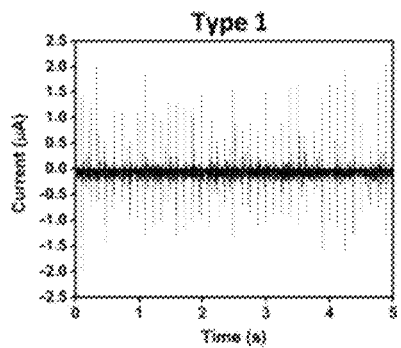

FIGS. 4A-4F illustrates output voltages and currents of three 3D-spacer fabric TENGs using an FPF structure over time. In FIG. 4A, a peak-to-peak output voltage of the Type 1 fabric TENG is 30 V indicating the lowest output voltage characteristic. The back surface of the Type 1 fabric has a honeycomb structure with a hexagonal honeycomb structure. The honeycomb structure promotes deformation and increases a contact area and friction when the two layers experience contact and separation. However, the Type 1 fabric having a single jersey structure with a foil finish has a stiff surface, which has low elasticity, and thus has a low output voltage. In FIG. 4B, a peak-to-peak output voltage of the Type 2 fabric TENG is 44.7 V. Both the front and back surfaces have a single jersey structure, so that the elasticity is lower than that of the honeycomb structure, but by mixing 8% SP, the elasticity in the width direction is increased to exhibit a compliant output voltage. SP is mainly composed of polyurethane, which can increase the original length and maintain original elasticity. In FIG. 4C, the peak-to-peak output voltage of the Type 3 fabric TENG exhibits the highest output voltage characteristic as 50.3 V. Similarly, the back surface of the Type 1 fabric has a honeycomb structure, and thus has a large contact area and a high friction coefficient, thereby exhibiting excellent output voltage characteristics. In addition, the tricot structure on the front surface has excellent lateral elasticity, which induces high frictional charge generation, thereby exhibiting the highest peak-to-peak output voltage.

Figure 4E:
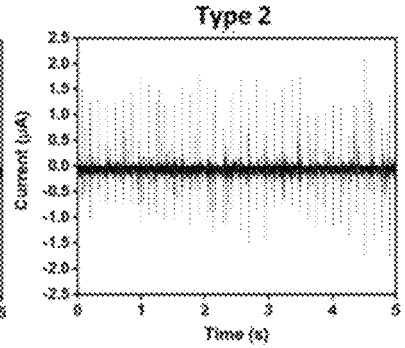
Figure 4F:
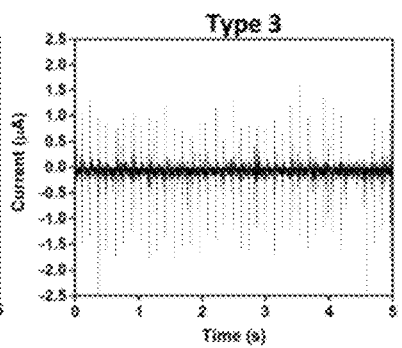

FIGS. 4D to 4F illustrate the output currents of the Type 1, Type 2, and Type 3 fabric TENGs, respectively. Here, it can be seen that there is little variation between output current characteristic curves of the different TENGs, and more significant variation occurs at the output voltage of each device. This is because the differentiation of potential is proportional to the surface charge density. Thus, a large variation is measured in the output voltages other than the currents.

Figure 5:
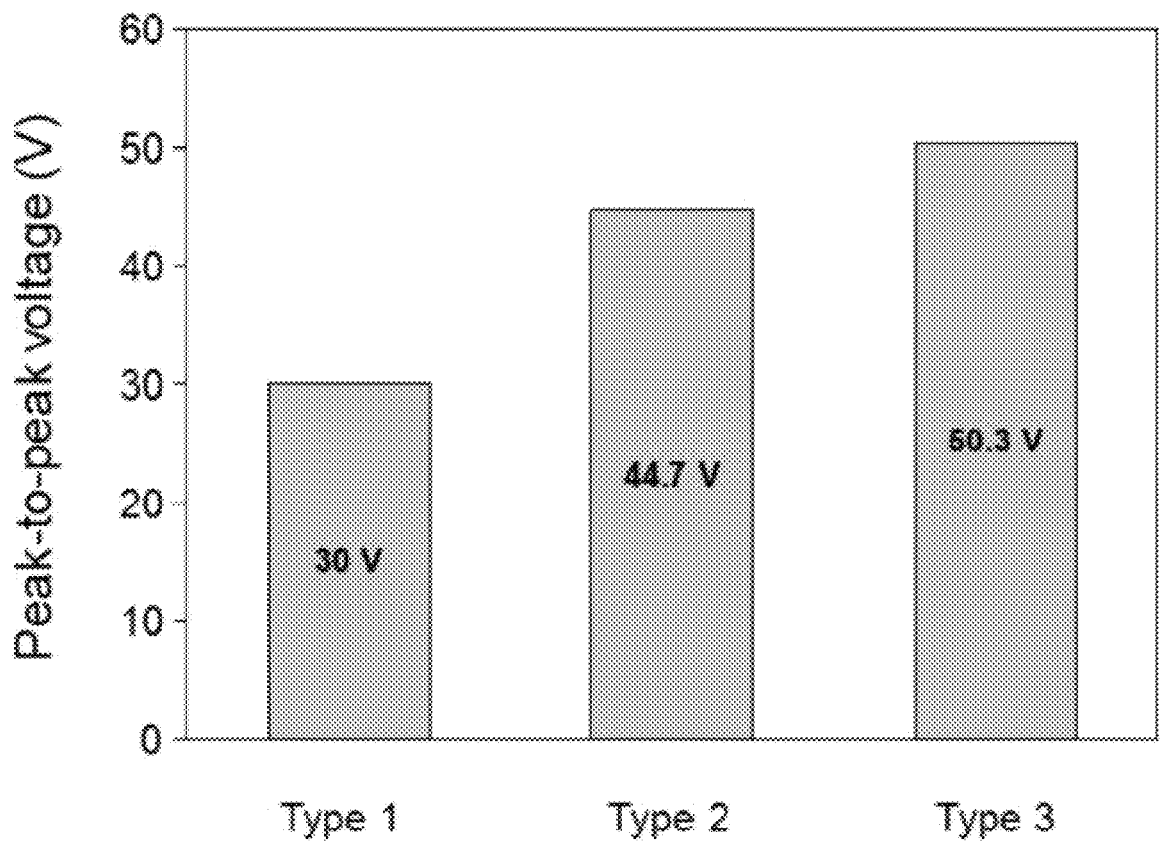
FIG. 5 is a graph comparing peak-to-peak output voltages of three types of fabric TENGs according to each embodiment of the present disclosure.

FIG. 5 is a graph comparing peak-to-peak output voltages of three types of fabric TENGs according to each embodiment of the present disclosure. The output voltage of the Type 3 fabric TENG with a honeycomb structure (front surface) and a tricot structure (back surface) improves the triboelectric effect according to the structure and shows higher peak-to-peak output voltage than the Type 2 fabric TENG and the Type 1 fabric TENG. Thus, it can be seen that the output voltage can be improved according to the fabric that is used, even in the TENG with the same structure.

In addition to other reasons, a change in surface roughness of the fabric may be affected on the variation in output voltage values of each TENG. In order to confirm this, the surface roughness of each fabric was further characterized. Since the fabric is made of thin threads, it is almost impossible to estimate the surface roughness of the fabric by analyzing atomic force microscope (AFM) images. The side view SEM images (FIGS. 3A-3L) of the sample suggest that the surface roughness of the fabric is in mm scale. Since it is impossible to estimate surface roughness values of different fabrics from AFM measurement, contact angle measurement was utilized to indirectly estimate surface roughness factors (Table 1) of the different fabrics. The Cassie-Baxter equation (Equation 1) was used to estimate the surface roughness factors, which are most appropriate for these types of systems.

$$\cos\theta_A = r_f(\cos\theta_Y + 1) - 1 \quad \text{[Equation 1]}$$

where $\theta_A$ is an apparent contact angle, $\theta_Y$ is a contact angle value estimated by Young's relation, and $r_f$ is the surface roughness factor (a ratio of true area of the solid surface to an apparent area. i.e., $r_f=1$ stands for smooth surface).

TABLE 1

| Fabric | Surface | Apparent Contact Angle (°) | Young's Contact Angle (°) | Roughness Factor ($r_f$) |
|---|---|---|---|---|
| Type 1 | Front | 84.37 | 82.4 | 0.97 |
|  | Back | — | — | — |
| Type 2 | Front | 80.21 | 77.25 | 0.96 |
|  | Back | 79.63 | 75.24 | 0.93 |
| Type 3 | Front | 76.99 | 70.58 | 0.93 |
|  | Back | 72.72 | 64.62 | 0.90 |

It can be observed from Table 1 that the back surface of the Type 3 fabric has the most rough surface (with a minimum surface roughness factor value). Higher surface roughness with other elements, such as good lateral elasticity, may be another reason that achieves the highest output voltage from the Type 3 fabric-based TENG.

Three 3D-spacer fabrics were proposed to improve the output voltage of the TENG, and output voltage characteristics were compared. The three 3D-spacer fabrics exhibited changes in output voltage due to surface friction, structure, and vertical fibers. The Type 1 fabric TENG, which has a honeycomb structure but uses a single jersey structure with a foil finish, has low elasticity, resulting in the lowest output voltage of 30 V. By adding SP, to the Type 2 fabric with a single jersey structure, the elasticity in the width direction was increased, and the Type 2 fabric TENG showed an output voltage of 44.7 V. The Type 3 fabric TENG using a tricot structure and a honeycomb structure further increased a transverse stretch, resulting in the highest output voltage of 50.3 V. According to the present disclosure, a high-efficiency TENG can be manufactured in an inexpensive and simple process. In addition, it is expected to contribute to the commercialization of next-generation wearable electronic devices and sleep monitoring sensors.

According to the present disclosure, a high-efficiency triboelectric nanogenerator (TENG) can be manufactured in an inexpensive and simple process.

In addition, next-generation wearable electronic devices and sleep monitoring sensors can be commercialized according to the present disclosure.

Hereinabove, the exemplary embodiment of the present disclosure is disclosed for an illustrative purpose and hereinafter, modifications, changes, substitutions, or additions of various other embodiments will be made within the technical spirit and the technical scope of the present disclosure disclosed in the appended claims by those skilled in the art.

Since various substitutions, modifications, and changes of the present disclosure described above are possible within the scope that does not depart from the technical spirit of the present disclosure for those of ordinary skill in the art to which the present disclosure pertains, the scope of the present disclosure is not limited by the above-described embodiments and the accompanying drawings.

What is claimed is:

1. A triboelectric nanogenerator (TENG) comprising:
a polydimethylsiloxane (PDMS) layer;
a three-dimensional (3D)-spacer fabric formed on each of a front surface and a back surface of the PDMS layer, and having a three-dimensional structure on each of a front surface of thereof and a back surface thereof; and
an electrode inserted between the PDMS layer and each 3D-spacer fabric,
wherein each of the front and back surfaces of the 3D-spacer fabric has one of a single jersey structure, a honeycomb structure, or a tricot structure.

2. The TENG of claim 1, wherein the 3D-spacer fabric is made of polyester (PE).

3. The TENG of claim 2, wherein the 3D-spacer fabric is a Type 1 fabric having the single jersey structure on the front surface thereof and the honeycomb structure on the back surface thereof.

4. The TENG of claim 2, wherein the 3D-spacer fabric is a Type 2 fabric having the single jersey structure on both the front surface thereof and the back surface thereof.

5. The TENG of claim 2, wherein the 3D-spacer fabric is a Type 3 fabric having the honeycomb structure on the front surface thereof and the tricot structure on the back surface thereof.

6. The TENG of claim 1, wherein the 3D-spacer fabric is made of a mixed material of PE and spandex (SP).

7. The TENG of claim 6, wherein the 3D-spacer fabric is a Type 1 fabric having the single jersey structure on the front surface thereof and the honeycomb structure on the back surface thereof.

8. The TENG of claim 6, wherein the 3D-spacer fabric is a Type 2 fabric having the single jersey structure on both the front surface thereof and the back surface thereof.

9. The TENG of claim 6, wherein the 3D-spacer fabric is a Type 3 fabric having the honeycomb structure on the front surface thereof and the tricot structure on the back surface thereof.

10. The TENG of claim 1, wherein the 3D-spacer fabric is a Type 1 fabric having the single jersey structure on the front surface thereof and the honeycomb structure on the back surface of thereof.

11. The TENG of claim 10, wherein the front surface of the 3D-spacer fabric is finished with a foil treatment.

12. The TENG of claim 1, wherein the 3D-spacer fabric is a Type 2 fabric having the single jersey structure on both the front surface thereof and the back surface of thereof.

13. The TENG of claim 1, wherein the 3D-spacer fabric is a Type 3 fabric having the honeycomb structure on the front surface thereof and the tricot structure on the back surface of thereof.

* * * * *